(12) United States Patent
Nagasaka et al.

(10) Patent No.: US 9,309,123 B2
(45) Date of Patent: Apr. 12, 2016

(54) PROCESS FOR PRODUCING A CARBON NANOSTRUCTURE

(75) Inventors: Takeshi Nagasaka, Tokyo (JP); Masahiro Yamamura, Sakai (JP); Yoshito Watanabe, Izumi (JP); Masaki Kondo, Izumisano (JP); Yoshikazu Nakayama, Hirakata (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 1107 days.

(21) Appl. No.: 12/733,771

(22) PCT Filed: Sep. 19, 2008

(86) PCT No.: PCT/JP2008/066975
§ 371 (c)(1),
(2), (4) Date: Jun. 28, 2010

(87) PCT Pub. No.: WO2009/038172
PCT Pub. Date: Mar. 26, 2009

(65) Prior Publication Data
US 2010/0291297 A1 Nov. 18, 2010

(30) Foreign Application Priority Data
Sep. 21, 2007 (JP) .................................. 2007-244712

(51) Int. Cl.
*C23C 16/00* (2006.01)
*C01B 31/02* (2006.01)
(Continued)

(52) U.S. Cl.
CPC ........... *C01B 31/0233* (2013.01); *B01J 23/745* (2013.01); *B01J 35/002* (2013.01);
(Continued)

(58) Field of Classification Search
CPC ...... B01J 31/00; B01J 23/745; B01J 37/0215; B01J 21/0215; B01J 35/002; C23C 16/26
USPC ......................................................... 427/249.1
See application file for complete search history.

(56) References Cited

U.S. PATENT DOCUMENTS 4,218,341 A * 8/1980 Lakatos et al. ................. 502/164
2002/0159944 A1 * 10/2002 Smalley et al. ............. 423/447.6
(Continued)

FOREIGN PATENT DOCUMENTS

JP 2004-139972 5/2004
JP 2005-75725 3/2005
(Continued)

*Primary Examiner* — Kelly M Gambetta
(74) *Attorney, Agent, or Firm* — DLA Piper LLP (US)

(57) ABSTRACT

This invention provides a method for forming a catalyst layer for carbon nanostructure growth, which can eliminate the influence of water in a liquid for catalyst layer formation, can grow homogeneous and highly oriented carbon nanostructures over the whole area of a substrate and can realize mass production of the carbon nanostructures, and a liquid for catalyst layer formation for use in the method, and a process for producing carbon nanostructures using the catalyst layer formed by the method. The catalyst layer for use in the production of CNTs is formed by preparing a catalyst metal salt solution of a catalyst metal-containing metal compound (a catalyst metal salt) dispersed or dissolved in a solvent having an ample wettability towards the substrate and coating the catalyst metal salt solution onto the substrate to a form a thin film. The thin film is then heat treated to form a catalyst layer. The substrate with the dried catalyst layer formed thereon is introduced into a carbon nanostructure synthetic device, and CNTs are grown by a thermal CVD method.

2 Claims, 9 Drawing Sheets

(51) Int. Cl.
*B01J 23/745* (2006.01)
*B01J 35/00* (2006.01)
*B01J 37/02* (2006.01)
*B82Y 30/00* (2011.01)
*B82Y 40/00* (2011.01)

(52) U.S. Cl.
CPC .......... *B01J37/0215* (2013.01); *B01J 37/0219* (2013.01); *B82Y 30/00* (2013.01); *B82Y 40/00* (2013.01); *C01B 2202/20* (2013.01); *C01B 2202/34* (2013.01)

(56) References Cited

U.S. PATENT DOCUMENTS

| | | | |
|---|---|---|---|
| 2003/0086859 A1* | 5/2003 | Kawakami et al. | 423/447.1 |
| 2004/0147620 A1* | 7/2004 | Wang et al. | 518/715 |
| 2005/0074392 A1* | 4/2005 | Yang et al. | 423/447.3 |
| 2005/0106094 A1* | 5/2005 | Kondo | 423/447.1 |
| 2005/0147869 A1* | 7/2005 | Suzuki et al. | 429/42 |
| 2006/0083674 A1* | 4/2006 | Maruyama et al. | 423/447.3 |
| 2006/0228478 A1* | 10/2006 | Iwaki et al. | 427/249.1 |
| 2007/0219083 A1* | 9/2007 | Zhang et al. | 502/150 |
| 2009/0047206 A1* | 2/2009 | Okazaki et al. | 423/445 B |
| 2012/0122020 A1* | 5/2012 | Hata et al. | 429/532 |

FOREIGN PATENT DOCUMENTS

| | | | |
|---|---|---|---|
| JP | 2006-007213 | 1/2006 | |
| JP | 2006-239618 | 9/2006 | |
| JP | 2007-091530 | 4/2007 | |
| WO | WO 2004/071654 | 8/2004 | |
| WO | WO 2006011655 A1 * | 2/2006 | 429/532 |
| WO | WO 2007108455 A1 * | 9/2007 | 423/445 B |

* cited by examiner

PROCESS FOR PRODUCING A CARBON NANOSTRUCTURE

FIELD OF THE INVENTION

The present invention concerns with a catalyst layer forming method for forming a catalyst for growth of carbon nanostructures such as carbon nanotubes or carbon nanocoils on a substrate, using a catalyst layer formation liquid and a method for forming a catalyst layer, and a carbon nanostructure production method for producing carbon nanostructures by means of a catalyst layer formed on a substrate. In particular, the production method of carbon nanostructures concerning the present invention relates to a production method based on a thermal CVD method where carbon nanostructures are grown by a thermal CVD treatment on a substrate on which a catalyst layer is formed.

BACKGROUND ART

Carbon nanostructure of the present invention is a nanosize material composed of carbon atoms. For example, there are carbon nanotube, beaded carbon nanotube in which beads are formed on a carbon nanotube, carbon nanobrush in which many carbon nanotubes bristle, carbon nanotwist in which a carbon nanotube is twisted, carbon nanocoil in a coil form, and carbon nanohorn. In the following, these various carbon substances are referred to as carbon nanostructures.

As for a method to produce these carbon nanostructures, there exists a thermal CVD method, a type of chemical vapor deposition method (CVD, Chemical Vapor Deposition) where a raw material gas of hydrocarbon is decomposed so that a given material is grown. That is to say, a catalyst chemical vapor deposition method (CCVD method, Catalyst Chemical Vapor Deposition), in which a given material is grown using a catalyst, is known.

The present invention relates to a method for producing carbon nanostructures by said thermal CVD method. This chemical vapor deposition method refers in general to a method for decomposing a raw material gas in a reaction container, so that a given material is grown. Various decomposing means such as heat, electron beam, laser beam, ion beam and such are included among the decomposing means.

Conventionally, to produce carbon nanostructures by chemical vapor deposition, a production method is adopted, in which a mixed gas of a raw material gas and a carrier gas is introduced into a reaction chamber, the raw material gas is decomposed by a catalyst, and the carbon nanostructures are grown on the catalyst surface.

For example, when carbon nanostructures are applied to an electron emission source, an electronic part of an electrode and such, or a fuel cell, the physical property of the carbon nanostructures influences its performance. In particular, the uniformity of the physical properties such as diameter, density, height (film thickness) and such is required. In addition, the uniformity of carbon nanostructures obtained by a thermal CVD method depends greatly upon the formation precision of the catalyst layer used for the growth.

In addition, for these applications, it is desirable for the carbon nanostructures to be highly oriented. The high orientation, as referred here, signifies that the direction of the carbon nanostructures grown from a substrate is even. This is also referred to as brush-like. The direction of a carbon nanostructure usually is perpendicular with respect to the substrate, and the lengths of carbon nanostructures are approximately equal (see FIG. 8). Such highly oriented carbon nanostructures are used with the whole substrate, or after being transferred while maintaining the highly oriented state. Applications for such highly oriented carbon nanostructures are being developed as a capacitor, an electrode, and in production of a rope that is spun directly from the substrate. On the other hand, it is also used as a mass production method of carbon nanostructures with even lengths.

Formation methods of catalyst layers used in a thermal CVD method are disclosed in Patent Document 1-4. In Patent Document 1, the formation of a catalyst layer through evaporation by electron beam is described In Patent Document 2, the formation of a catalyst coating film layer is described, in which a catalyst metal compound is combined with an alcohol compound and an amino compound and then converted into a paste, and this paste is coated on a substrate. In Patent Document 3, the formation of a catalyst coating film layer is described, in which iron nitrate is dissolved in a liquid mixture of an alcohol, such as ethanol, and terpineol, and then this solution is coated on a substrate of a silicon wafer. Patent Document 4 describes the adhesive formation of fine particles of a catalyst metal oxide by dissolving ferric acetate in a solvent comprising alcohols such as ethanol, dip-coating or spreading this solution on a silicon substrate, heat-treating in an oxidative atmosphere, removing of the solvent component remaining on the substrate by oxidative degradation, and heat-treating in the atmosphere of an inert gas or a gas having a reductive property.

[patent document 1] Japanese Patent Laid-Open No. 2005-75725

[patent document 2] Japanese Patent Laid-Open No. 2007-91530

[patent document 3] Japanese Patent Laid-Open No. 2006-239618

[patent document 4] PCT WO2004/071654 Bulletin

DISCLOSURE OF THE INVENTION

Problems to be Solved by the Invention

In the catalyst layer forming method in of Patent Document 1, because complex and expensive devices such as high vacuum evaporation devices are needed, the facilities and the usage also become expensive. In addition, there is a limit in forming a catalyst layer on a substrate with a large area. Moreover, because the film formation cannot be achieved in a short time, it is unreasonable to form catalyst layers on a large quantity of substrates. Therefore, the method of Patent Document 1 is unsuitable for the mass production of substrates coated with carbon nanostructures.

In the catalyst layer forming method of patent document 2, because the catalyst layer cannot be made thin, various problems occurs such as the length of the oriented carbon nanostructures becoming short (low), the bulk density of the oriented carbon nanostructures decreasing extremely, and carbon nanostructures not growing in some cases because of the size of catalyst particles becoming too large. In this prior art, a coating film is formed by coating the catalyst metal paste. Because this paste has high viscosity, poor fluidity, and low spreading wettability, the formed coating film becomes thick. For example, the thickness ($\tau$) of a coating film formed by means of the spin coat method can be expressed by Equation 1. (K: constant, $\rho$: concentration of solids, $v$: liquid viscosity, $\lambda$: rotating speed.)

$$\tau = K \rho 2v/\lambda^{1/2} \qquad \text{(Equation 1)}$$

As thus described, be cause the thickness of the coating film is proportional to the liquid viscosity, the above equation indicates that the coating film thickens if a liquid with high viscosity is used.

In other words, it is self-evident that whenever a catalyst coating film thickens, the catalyst layer generated by the coating film also thickens. The catalyst on the substrate granulates when the catalyst itself is heated during the growth of the carbon nanostructures, and the carbon supplied from the raw material gas shifts to the process forming carbon nanostructures. That the thickness of the catalyst layer has a big influence on the diameter of the initially formed catalyst particles is evident from the observation that the particle size (diameter) of the initially formed catalyst particles is large whenever the thickness of the first catalyst film is large. On the other hand, it has been ascertained that the diameter of the catalyst particles immediately before the ingredient is supplied corresponds to the inside diameter of the carbon nanostructures. Thus, it has been ascertained that the thickness of the catalyst film during the formation of the carbon nanostructures determines the size of the initially formed catalyst particles, and therefore has an influence on the diameter of the carbon nanostructures.

In addition, by further continuing the heat application for a long time after the initial particle formation, the particles become fused, and an enlargement of the particles begins to occur. In the end, all particles become enlarged to a size where they cannot form carbon nanostructures. When this process is examined, it may be said that the catalytic activity of a catalyst for forming carbon nanostructures is greatly affected by the thickness of the initially formed catalyst film, the catalytic activity furthermore depends upon the diameter of the catalyst particles, and the activity decreases as the particle size increases. Therefore, when the catalyst layer becomes thick, particles lacking the catalytic activity increase in number. When carbon nanostructures are synthesized under such condition, minute spaces are produced in which carbon nanostructures are not generated.

For an aggregate of carbon nanostructures to become highly oriented, the carbon nanostructures must mutually control their growth directions by growing while they are mutually contacting. Therefore, the growth directions of the carbon nanostructures become uneven when minute spaces arise in which the carbon nanostructures do not come into a mutual contact. In the end, if the catalyst layer becomes thick, situations occur where the lengths of the oriented carbon nanostructures become short (low), the bulk density of the oriented carbon nanostructures decreases extremely, or occasionally, carbon nanostructures do not grow because the catalyst particle size has become too large.

The scanning electron microscopy (SEM) photograph of the carbon nanotubes in Patent Document 2 clearly shows that the orientation of the carbon nanotubes is low. In addition, it has been confirmed, in an experiment by the present inventors, that the orientation of growing carbon nanostructures becomes low when the catalyst layer is made thick.

In the catalyst layer forming method of Patent Document 3, a problem arises from an effect of water. In this prior art, the formation atmosphere of the catalyst layer is air, but it is usual that small amount water is contained in air. As such, when trace water is contained in the atmosphere, because alcohols such as ethanol are hygroscopic, water is inevitability absorbed from said atmosphere into the solution for catalyst layer formation. In addition, because water of crystallization is contained in metal salts such as iron nitrate, this water of crystallization diffuses into the hydrophilic alcohol, and water is inevitably mixed into the solution for catalyst layer formation. When water is contained in this solution, hydrolytic reaction occurs within the solution, and precipitates of hydroxides such as iron hydroxide $Fe(OH)_3$ are produced. When such solution is used, a uniform and predetermined film thickness is not achieved. Therefore, even when a thermal CVD treatment is applied, growth of carbon nanostructures such as carbon nanotubes does not occur. Because of this, when a solution of ethanol and iron nitrate, for example, is used, the service life is limited to the short time that said hydrolysis reaction does not proceed, and therefore, completing all the treatments for mass production within this service life is difficult. It is unsuitable for mass production of carbon nanotubes and such.

In addition, because the boiling point of a lower alcohol such as methanol and ethanol is normally lower than that of water, a situation occurs where the alcohol evaporates first, and water and terpineol remain on the substrate surface, upon coating the catalyst layer formation solution on a substrate and then heat-drying. Terpineol has a property of low mutual solubility with water, where it does not mix with more than a certain amount of water, and its boiling point is higher than said alcohols (such as ethanol) and water. Therefore, when said solution is used for coating film formation on the substrate surface, the concentration of terpineol gradually increases through the volatilization process, and the solution demixes on the substrate into two layers of water and the terpineol ingredient. Moreover, substrates such as silicon wafers are water-repellent. Because of this, in places that became covered with water, defects of repelling patterns where the water was repelled appear after drying. It was found that carbon nanotubes do not grow at all in these defective spots. In particular, said coating film layer must be made thin in order to make the finally formed catalyst layer into a thin film. Said repelling pattern becomes more obvious as said coating film becomes thinner, and therefore a homogeneous generation of carbon nanotubes on a substrate through the technology of Patent Document 3 is difficult.

For preventing such influence of the water content and such two-layer demixing process, there is a method to remove the water by dehydration by means of a dehydrating agent such as molecular sieves. However, the labor for the treatment becomes intensive if the water in the solution is to be completely removed, an expense for the dehydration treatment is required, and the method causes a problem of an increase in the production cost of carbon nanotubes and such.

In the catalyst layer forming method of Patent Document 4, the solution in which a catalyst metal salt has been dissolved under air in a solvent comprising alcohols is refined, and then this solution is coated on a substrate. Because of this, said alcohol absorbs water from air, and water inevitably diffuses and mixes into the solution. Moreover, in Patent Document 4, water, organic solvents, and their mixed solvents are listed among the solvents, and it is written that up to 5 weight % of water may be mixed even when an organic solvent is used. An active introduction of water is encouraged. Therefore, by this prior art, water exists abundantly within said solution, the alcohol evaporates first in the drying process, and as a result, water and the catalyst metal salt remain behind on the water-repellent substrate such as a silicon wafer. Water disperses as droplets on the silicon wafer having strong water repellency. This situation becomes more important whenever the coating film becomes a thinner film. When the drying process proceeds and the water is vaporized, a large quantity of repelling patterns are formed on the substrate, inhibiting the generation of homogeneous carbon nanostructures, and complicating the mass synthesis of high-quality carbon nanostructures. Furthermore, an extra process is required where a heat-treatment is done after drying the coating film on the substrate under the atmosphere of an inert gas or a gas having a reductive property and thereby adhesively forming particles of the catalyst metal oxide. Because of this, a problem is caused in which the cost is increased by the catalyst layer formation step.

In view of the above problems, the present invention offers: a formation method of a catalyst layer for carbon nanostructure growth in which the influence of water in the liquid for catalyst layer formation is mostly removed, a homogeneous and thin coating film is formed over the entire substrate surface, a homogeneous catalyst layer can be realized after heat application, and homogeneous and highly oriented carbon nanostructures can be synthesized in large quantities and their mass production at low cost can be realized; a liquid for catalyst layer formation for use in said formation method; and a carbon nanostructure production method using a catalyst layer formed by said formation method.

Means to Solve the Problems

The present inventors, as a result of having examined the problem intensively, took notice of the fact that by using a solvent whose wettability with substrates for carbon nanostructure growth is good, has a hydrophilic property (mutual solubility) of mixing well with water, and has a higher boiling point than water, the water-repelling phenomenon on a substrate and the two-layer demixing do not occur, even by a treatment under water-containing atmosphere, or even if water is included in the liquid through the use of a metal compound containing water of crystallization. That is to say, the present inventors reached the following conclusion: Because water is removed first when the solvent with said property is used, the solvent component whose boiling point is higher than water is left behind, defects of repelling pattern by the water component can also be eliminated, and a growth of homogeneous and highly-oriented carbon nanostructures becomes possible.

The present invention was achieved based on the above conclusion, and the first form of the present invention is a method for forming a catalyst layer, characterized in that a catalyst layer for growing a highly oriented carbon nanostructure on a substrate through a thermal CVD treatment is formed on said substrate in a water-containing atmosphere whose water concentration is greater than or equal to 1000 ppm, and said method for forming said catalyst layer comprises the steps of a coating process in which a liquid is prepared by dispensing or dissolving a metal compound including a catalyst metal in a solvent with ample wettability and then said liquid is coated on said substrate so that a coating film layer including said metal compound is formed, and a heat-treatment process in which said catalyst layer is formed by heating said metal compound, wherein said solvent is a special solvent that has a property of mutual solubility with water and higher boiling point than water, or a mixed solvent containing said special solvent.

The second form of the present invention is the method for forming a catalyst layer of the first form, wherein the thickness of said catalyst layer is 0.5 nm-10 nm.

The third form of the present invention is the method for forming a catalyst layer of the first or second form, wherein said special solvent comprises one or more kinds among alcohols, glycols, glycol ethers, esters, ketones, or aprotic polar solvents.

The fourth form of the present invention is the method for forming a catalyst layer of the third form, wherein said alcohols comprise one or more kinds among 1-butanol, 2-butanol, or diacetone alcohol.

The fifth form of the present invention is the method for forming a catalyst layer of the third or fourth form, wherein said glycols comprise one or more kinds among ethylene glycol, propylene glycol, or diethylene glycol.

The sixth form of the present invention is the method for forming a catalyst layer of any one of the third to fifth forms, wherein said glycol ethers comprise one or more kinds among ethylene glycol monomethyl ether, ethylene glycol monomethyl ether acetate, ethylene glycol monoethyl ether, ethylene glycol monoethyl ether acetate, propylene glycol monomethyl ether, or propylene glycol monoethyl ether.

The seventh form of the present invention is the method for forming a catalyst layer of any one of the third to sixth forms, wherein said esters comprise ethyl lactate.

The eighth form of the present invention is the method for forming a catalyst layer of any one of the third to seventh forms, wherein said ketones comprise acetylacetone.

The ninth form of the present invention is the method for forming a catalyst layer of any one of the third to eighth forms, wherein said aprotic polar solvents comprise one or more kinds among dimethyl sulfoxide, N-methyl-2-pyrrolidone, or N,N-dimethylformamide.

The tenth form of the present invention is the method for forming a catalyst layer of any one of the first to ninth forms, wherein said liquid in which said metal compound is dispersed or dissolved does not generate precipitates even when it is left unattended at room temperature in a water-containing atmosphere whose water concentration is greater than or equal to 1000 ppm for one month.

The eleventh form of the present invention is the method for forming a catalyst layer of the tenth form, wherein said metal compound comprises a non-sublimable iron complex, nickel complex, or cobalt complex.

The twelfth form of the present invention is the method for forming a catalyst layer of any one of the first to eleventh forms, wherein the concentration of said metal compound in said liquid is within the range of 0.2-8.0 weight %, and the combination concentration of said special solvent chosen among said alcohols, said glycols, said glycol ethers, said esters, said ketones, and said aprotic polar solvents is within the range of 5.0-99.8 weight %.

The thirteenth form of the present invention is a liquid for catalyst layer formation, characterized in that said liquid is used for forming on a substrate a catalyst layer for growing a highly oriented carbon nanostructure on said substrate through a thermal CVD treatment, by a coating and drying treatment in a water-containing atmosphere whose water concentration is greater than or equal to 1000 ppm, and said liquid is prepared by dispersing or dissolving a metal compound including a catalyst metal in a solvent with ample wettability with said substrate, wherein said solvent is a special solvent that has a property of mutual solubility with water and higher boiling point than water, or a mixed solvent containing said special solvent.

The fourteenth form of the present invention is the liquid for catalyst layer formation of the thirteenth form, wherein said special solvent comprises one or more kinds among alcohols, glycols, glycol ethers, esters, ketones, or aprotic polar solvents.

The fifteenth form of the present invention is a method for producing a carbon nanostructure, characterized in that a catalyst layer is formed on a substrate by the method for forming catalyst layer of any one of the first to twelfth forms, a raw material gas is distributed to said catalyst layer, and a carbon nanostructure is grown through a thermal CVD treatment and thus produced on said substrate by the catalytic action of said catalyst layer.

Effects of the Invention

According to the first form of the present invention, because in said coating step, said catalyst coating film layer is formed by using a liquid in which a metal compound including a catalyst metal has been dispersed or dissolved in a solvent with ample wettability with said substrate, the solvent component binds to said substrate surface sufficiently and uniformly because of the good wettability of said solvent, and homogenization and thickness reduction of the catalyst coating film layer become possible. Because the carbon nanostructures grow densely due to this homogenization and thickness reduction, the orientation of the carbon nanostructures becomes high. Because said liquid formation and coating steps are done under water-containing atmosphere of air and such, a trace amount of water from said water-containing atmosphere is necessarily absorbed and then permeated and diffused in the liquid. However, because said liquid spreads evenly over the substrate surface, the trace water too is forced to diffuse uniformly over the entire substrate surface, and the solvent molecules, the metal compound, and the trace water are diffused and distributed uniformly in molecular state within the catalyst coating film layer. Therefore, in the drying process, the water molecules that had been dispersed in molecular state within the solvent evaporate cooperatively in conjunction with the evaporation of the solvent molecules. An extremely little water residue remains on the substrate after the evaporation, and the previously described repelling patterns become difficult to form on the substrate. For example, even if a transition metal salt of nitrate that contains water of crystallization is used as said metal compound, the trace amount of water of crystallization that diffuses into the liquid is diffused forcibly and evenly over said substrate surface in the same manner, and by the same physicochemical process, water is prevented from remaining on the substrate.

The present inventors discovered that the invention of the present embodiment is effective in particular when the water concentration of the water-containing atmosphere is greater than or equal to 1000 ppm. The said water concentration is expressed as volume concentration. The concentration in which water vapor of 1 cc is contained in atmospheric volume of 1 m$^3$ is defined as 1 ppm (cc/m$^3$). It was found in this investigative process that in cases in which a prior technology was used under a water concentration of less than or equal to 1000 ppm, an extremely little quantity of water was taken into the solvent even when the wettability of the solvent towards the substrate was slightly poor, and the water repelling patterns after the heat treatment were almost unnoticeable. However, when it becomes greater than or equal to 1000 ppm, the water repelling patterns become noticeable, and it was found that the formation of a homogeneous catalyst layer became difficult unless the wettability of the solvent toward the substrate was good. Therefore, with the present invention, a particularly evident effect can be obtained when said coating and heat-treatment steps are carried out in a water-containing atmosphere in which the water concentration is greater than or equal to 1000 ppm.

The wettability of said solvent towards a substrate is determined by the contact angle of a solvent droplet on the substrate. Size of said contact angle depends upon both the substrate type and the solvent type. The present inventors chose silicon wafers, quartz plates, fused silica plates, and sapphire plates for the substrates, and as a result of having examined various solvents, determined that said effect of the present invention could be exhibited if said contact angle of the solvent is less than or equal to 20 degrees. For the specific group of solvents described below, it has been confirmed that said contact angle is less than or equal to 20 degrees. In other words, in the present invention, if the wettability towards a substrate is good, it signifies that the contact angle of the solvent towards the substrate is less than or equal to 20 degrees. In the case that the contact angle towards the substrate is less than or equal to 20 degrees, a uniform catalyst coating film layer is obtained throughout the entire substrate surface. On the other hand, when said contact angle exceeds 20 degrees, the wettability deteriorates, the catalyst coating film layer becomes nonuniform, and the advantage offered by the present invention becomes more difficult to be manifested in full scope. For the study of contact angle, automatic solid surface energy analyzer CA-VE, made by Kyowa Interface Science Co., Ltd., was employed as the measuring device for contact angle. Terpineol of Patent Document 3 not only has poor wettability with substrates, but also separates from water. In addition, in the solution described in Patent Document 4, excess moisture is mixed intentionally. Both had the flaw of developing said repelling patterns, but in the present invention, these flaws are fully corrected.

As said solvent, a special solvent that has a mutual solubility with water and a property that the boiling point is higher than water is used, or a mixed solvent containing said special solvent is used. In the present invention, a solvent that has a mutual solubility with water and a property that the boiling point is higher than water is referred to as a special solvent. Because said special solvent has a mutual solubility with water, water mixes into said solvent in molecular state. During the drying step, a demixing process into the solvent component and water does not occur at all, and the shortcoming of the two-layer separation seen with Patent Document 3 is completely overcome. Therefore, even if water absorption occurs from the water of crystallization that is included in said metal compound such as a transition metal salt, or from the water-containing atmosphere, water is taken into said liquid in a mutually soluble state. The water that remains in a separated state on said substrate surface can thus be exhausted, and the detrimental influence of water on the substrate surface can be eliminated.

In addition, because the boiling point of the special solvent is higher than that of water, the water that has been mutually dissolved into the special solvent evaporates first during the drying step. Because of that, water does not ultimately bind and remain on said substrate surface, and development of detrimental defects that previously occurred, such as repelling patterns, can be prevented. In other words, existing on the substrate surface at the end stage of the volatilization process is the special solvent that has a good wettability towards the substrate. The metal compound that has been dissolved and dispersed evenly in this special solvent diffuses evenly on the substrate surface in a thin film form, and a uniform film of the metal compound is formed after the evaporation of the special solvent. In addition, even in a case where a mixed solvent made by mixing a special solvent and other solvents is used, the working effect of the previously described special solvent can be made to manifest entirely, if the condition is set so that the special solvent ultimately remains behind during the volatilization process. Therefore, for said other solvent, it is preferable to choose a solvent whose boiling point is lower than the special solvent. As thus described, by using said special solvent, homogeneous carbon nanostructures can be made to grow by means of a thermal CVD treatment, without being affected by water. In Patent Document 3, terpineol whose boiling point is higher than water is employed, but terpineol does not dissolve mutually with water, and as a result, repelling patterns occurred through the water that demixed into two layers. However, in the present invention, this problem has been resolved. In addition, in Patent Document 4, a lower alcohol such as methanol or ethanol is used as the solvent. Because the boiling point of this lower alcohol is lower than water, water remained on the substrate surface, and repelling patterns occurred on the water-repelling substrate. In the present invention, this problem too has been resolved. In particular, in Patent Document 4, to form particles of the catalyst metal oxide adhesively, a heat-treatment step under atmosphere of an inert gas or a gas with a reductive property was needed in addition. However, in the present invention, such extra step becomes completely needless, and the formation cost of the catalyst layer can be lowered.

In the prior technology, because the metal compound dissolved and dispersed in the solvent becomes high in quantity when the thickness of said catalyst coating film layer is thick, said metal compound can easily cover the entire surface of a substrate, and the detrimental influence of above repelling patterns of water tended to become comparatively small. However, when said thickness becomes thin, there is almost no deposition of the metal compound to the repelling pattern area, and a detrimental phenomenon occurred in which carbon nanostructures do not grow in the repelling pattern area at all. In the present invention, repelling patterns do not form on the substrate surface at all after the heat-treatment, not only when the thickness of said catalyst coating film layer is thick, but also when it had become thin. Therefore, a homogeneous and even catalyst layer can be formed on the entire coating area of the catalyst coating film layer, because said metal compound precipitates on the entire substrate surface almost uniformly. It was confirmed through electron microscopy that a homogeneous and even catalyst layer could form even when the thickness of said catalyst coating film layer is only around 200 nm. A further reduction of the film thickness was attempted, and it was demonstrated by electron microscopy observation that a homogeneous and even catalyst layer is formed even when said thickness becomes less than or equal to 100 nm. As a result, the advantages offered by the present invention is manifested for either of thick film and thin film catalyst coating film layers, and over the entire surface of the catalyst layer, a uniform growth of carbon nanostructures could be realized.

For the coating steps usable in the present invention, there are spin coat method, spray method, and dip coat method among others. Spin coat method is a method in which a coating film formation liquid is dripped on a rotating substrate, and a coating film is formed and flattened by rotation and centrifugal force. The necessary devices are simple and inexpensive. In addition, by controlling the rotational velocity, the film thickness control of the coating film can be done easily too. Spray method is a method in which a coating film formation liquid is atomized and bound on a substrate. The film thickness control of the coating film can be done simply by controlling the flow rate of the gas for atomization, the flow rate of the coating film formation liquid, and the nozzle configuration. In addition, a coating film can be bound even on a non-planar object with an uneven configuration. Furthermore, an arbitrary pattern can be printed on a substrate by using a masking technique (spray print). In addition, because a coating film can be formed in a short time on a substrate with a large area, it is suitable for mass production. Dip coat method is a method in which a coating film is formed by putting a coating film formation liquid in a container, and soaking a substrate in the coating film formation liquid. The process is very simple, and it is most suitable in mass production.

If the catalyst layer that was formed by the invention of said first form is used, homogeneous, highly oriented carbon nanostructures can be grown by a thermal CVD treatment. Moreover, because the entire substrate surface can be used as the effective formation area of a catalyst coating film layer, an improvement of the yield can be planned, and a mass production of homogeneous, highly oriented carbon nanostructures can be realized.

In said first form, said water-containing atmosphere of the thermal CVD treatment is not limited to the ambient atmosphere containing a trace amount of water. There is also a situation in which a trace amount of water that had been contained in the storing cylinder of an inert gas permeates a substrate. The water-containing gas atmosphere supplied by these gas cylinders is included among the water-containing atmospheres of the present invention. Therefore, among the water-containing atmospheres, aside from the ambient atmosphere, other oxidizing gases and reducing gases are included. In addition, it can be applied to an inert gas atmosphere using a noble gas such as helium (He) and argon (Ar), or an inert gas such as nitrogen ($N_2$).

In addition, in said first form, said catalyst metal is a transition metal such as iron (Fe), cobalt (Co), nickel (Ni), molybdenum (Mo), and platinum (Pt). Iron, cobalt, and nickel are preferable in particular. In addition, it may be one kind or a mixture of two kinds or more of these metals.

Furthermore, in said first form, said metal compound is an organometallic salt or an inorganic metal salt. For example, acetates, oxalates, and citrates are included among the organometallic salts. In addition, nitrates and oxo acid salts are included among the inorganic metal salts. Furthermore, said metal compound may be one kind or a mixture of two kinds or more of these metal salts.

In addition, in said first form, for said substrate, a substrate of a ceramics material, an inorganic nonmetal, an inorganic nonmetal compound and such that has a durability against the thermal CVD treatment temperature are preferable. For example, a quartz plate, a silicon substrate, a silicon wafer, a quartz plate, a fused silica plate, a sapphire plate, or a stainless steel plate and such can be used.

According to the second form of the present invention, because the thickness of the formed catalyst layer is 0.5-10 nm, a sufficient thickness is provided for the catalyst layer to form uniformly, and at the same time, a necessary thinness is provided so that the forming carbon nanostructures could become highly oriented. If the catalyst layer is too thin, because the catalyst material on the substrate is not distributed uniformly over the substrate surface, locations appear on which carbon nanostructures are not formed on the substrate surface. Such defect of the carbon nanostructure surface layer weakens the strength of the said surface layer, and makes it unable to withstand practical uses.

On the other hand, the present inventors discovered that carbon nanostructures do not grow homogeneously and highly oriented if the catalyst layer is too thick. Because the thickness of the catalyst film determines the diameter of the early catalyst particles, when the catalyst layer is too thick, it does not function as a catalyst due to the diameter of the catalyst particles being enlarged. Because of this, minute spaces are created where carbon nanostructures do not grow, and the bulk density of the oriented structures falls. Because the carbon nanostructures cannot come into contact mutually at the time of growth due to these minute spaces, it becomes difficult for the growth directions of the carbon nanostructures to become uniform. Therefore, the orientation of the growing carbon nanostructures decreases. The present inventors discovered for the first time that in order to increase the orientation of the carbon nanostructures growing on a substrate, the thickness of the catalyst layer must be thin. The present invention is based on this discovery. As described above, an appropriate catalyst layer thickness is important for increasing the bulk density of the formed carbon nanostructures, and thus ensuring the strength of the surface layer. In addition, it is important in promoting the high orientation of the carbon nanostructures.

According to the third form of the present invention, because said special solvent comprises one kind or more among alcohols, glycols, glycol ethers, esters, ketones or aprotic polar solvents, it has a property of ample wettability with said substrate. As described in said first form, it can make the solvent component bind sufficiently to said substrate surface due to the good wettability, and by removing the influence of water through the coating operation by the binding ingredient, homogeneous and highly oriented carbon nanostructures can be grown by means of a thermal CVD treatment.

For said alcohols, alcohols comprising one kind or more among 1-butanol, 2-butanol, and diacetone alcohol according to the fourth form of the present invention are preferable.

For said glycols, glycols comprising one kind or more among ethylene glycol, propylene glycol, and diethylene glycol according to the fifth form of the present invention are preferable.

For said glycol ethers, glycol ethers comprising one kind or more among ethylene glycol monomethyl ether, ethylene glycol monomethyl ether acetate, ethylene glycol monoethyl ether, ethylene glycol monoethyl ether acetate, propylene glycol monomethyl ether, and propylene glycol monoethyl ether concerning the sixth form of the present invention are preferable.

For said esters, esters comprising ethyl lactate concerning the seventh form of the present invention are preferable.

For said ketones, ketones comprising acetylacetone concerning the eighth form of the present invention are preferable.

For said aprotic polar solvents, aprotic polar solvents comprising one kind or more among dimethyl sulfoxide, N-methyl-2-pyrrolidone, and N,N-dimethylformamide concerning the ninth form of the present invention are preferable.

All the above solvents have an ample wettability with said substrate, a mutual solubility with water, and a property that the boiling point is higher than water. By removing the influence of water sufficiently through their good wettability, said mutual solubility, and said boiling point property, they can make homogeneous and highly oriented carbon nanostructures grow by a thermal CVD treatment.

According to the tenth form of the present invention, said metal compound has a property that it does not generate precipitates even if it is left unattended in said liquid under a water-containing atmosphere with water concentration of more than 1000 ppm at room temperature for one month. Because of this, after the liquid preparation, enough time margin is provided for the coating step to the substrate, the preservation of the liquid and transportation time can be ensured, and the liquid preparation, the catalyst layer formation, and the production of carbon nanostructures can be devised freely, using methods such as continuous treatment or batch processing. As said metal compound, an inorganic salt or an organic salt that does not produce precipitates can be used. Said property of not producing precipitates is referred to as solution stability. By the experience of the present inventors, it has been learned that if there is a solution stability of three hours or more, shifting from the liquid preparation step to the coating step/heat-treatment steps can be done with an ample margin. If this minimum 3 hours of stability did not exist, obtaining a mass producibility would become difficult. An examination of various solvents for which said solution stability of three hours or more can be assured led to the present invention. In other words, it is necessary that the particle size distribution of the metal compound in the liquid have a stability of three hours minimum. When it is under three hours, the transition from the liquid preparation to the coating step/heat-treatment step becomes difficult in terms of time. In this invention, because the particle size distribution of the metal compound in the liquid is stable for 1 month minimally, not only the transition from the liquid preparation to the process steps becomes easy, but also the preservation and the transportation of the liquid become easy. Therefore, even if the location of liquid preparation, the location of catalyst layer formation, and the location of carbon nanostructure fabrication are different, because a mass production in which enough margin of time is provided can be realized, the industrial mass producibility can be increased.

According to the eleventh form of the present invention, a method for forming a catalyst layer is offered, in which a non-sublimable iron, nickel, or cobalt complex is used as said metal compound. In cases where a sublimable metal compound such as ferrocene is used, a catalyst layer is not produced, because the metal compound sublimes during the heat-treatment step. Among the non-sublimable metal compounds, in particular, if an iron, nickel, or cobalt complex is used, the previously described non-precipitating property is realized. That is to say, the solution stability extends to between several weeks and several months, and enough margin of time is available even if the location of liquid preparation, the location for catalyst layer formation, and the location for carbon nanostructure fabrication are different. Because of this, a mass production having a margin of time can be realized. For said iron complexes, there are tris[acetylacetonato] iron(III), hexacyanoiron(II) ammonium salt, hexakis[thiocyanato]iron(III) ammonium tetrahydrate salt, and tris[oxalato] iron(III) ammonium trihydrate salt. For said nickel complexes, there are bis[acetylacetonato]nickel(II) and bis [ethylenediamino]nickel(II) monohydrate. For said cobalt complexes, there are tris[acetylacetonato]cobalt(III), tris[ethylenediamino]cobalt(III) chloride trihydrate, and hexamminecobalt(III) chloride. When these metallic complexes are dissolved in a solvent, they become so completely dissolved that the particle size distribution cannot be measured, and the formation of a fine, uniformly even catalyst layer becomes possible.

According to the twelfth form of the present invention, because the concentration of said metal compound in said liquid is in the range of 0.2-8.0 weight %, and the combination concentration of one kind of special solvent chosen among said alcohols, said glycols, said glycol ethers, said esters, said ketones and said aprotic polar solvents is in the range of 5.0-99.8 weight %, through the solvent use at the concentration range or the combination concentration range, carbon nanostructures with better homogeneity and higher orientation can be grown by means of a thermal CVD treatment, under a good thermal CVD treatment environment from which the influence of water has been removed.

According to the thirteenth form of the present invention, because a metal compound including a catalyst metal is dispersed or dissolved in a solvent with an ample wettability towards said substrate for the preparation of said liquid for catalyst layer formation, the solvent component binds to said substrate surface sufficiently through the good wettability of said solvent, and through the coating operation by the binding component, the influence by said water-containing atmosphere and the moisture of said liquid can be removed from said substrate surface. Even if a transition metal salt of nitrate that includes water of crystallization is used, a binding and remaining of water onto said substrate and detrimental defects of water repelling patterns do not occur. In addition, a two-layer demixing process into the solvent component of said liquid and water does not occur, and homogeneous, highly oriented carbon nanostructures can be grown by a thermal CVD treatment, without being affected by the water from said water-containing atmosphere or the aqueous component of said transition metal salt.

According to the 14th form of the present invention, as said special solvent, a solvent comprising of one or more kinds among alcohols, glycols, glycol ethers, ester, ketones, and aprotic polar solvents is preferable, as described above.

According to the 15th form of the present invention, because a catalyst layer formed by the method for forming a catalyst layer according to any one of 1st to 12th form of the present invention is used, a growth and mass-production of homogeneous and highly oriented carbon nanostructures by a thermal CVD treatment becomes possible, through a sufficient removal of the influence of water.

DENOTATIONS OF REFERENCE NUMERALS

| | |
|---|---|
| 1 | Reaction chamber |
| 2 | Thermal CVD processing component |
| 3 | Reaction heater |
| 4 | Substrate |
| 5 | Catalyst coating film layer |

BEST MODE FOR CARRYING OUT THE INVENTION

Below, the embodiment of the carbon nanostructure production method is explained in detail according to the figures, wherein carbon nanostructures are produced through a thermal CVD method by means of a catalyst layer formed by the method for forming catalyst layer concerning the present invention. In the carbon nanostructure production method of the present embodiment, carbon nanotubes (termed "CNT" henceforth) are produced as carbon nanostructures.

Figure 1:
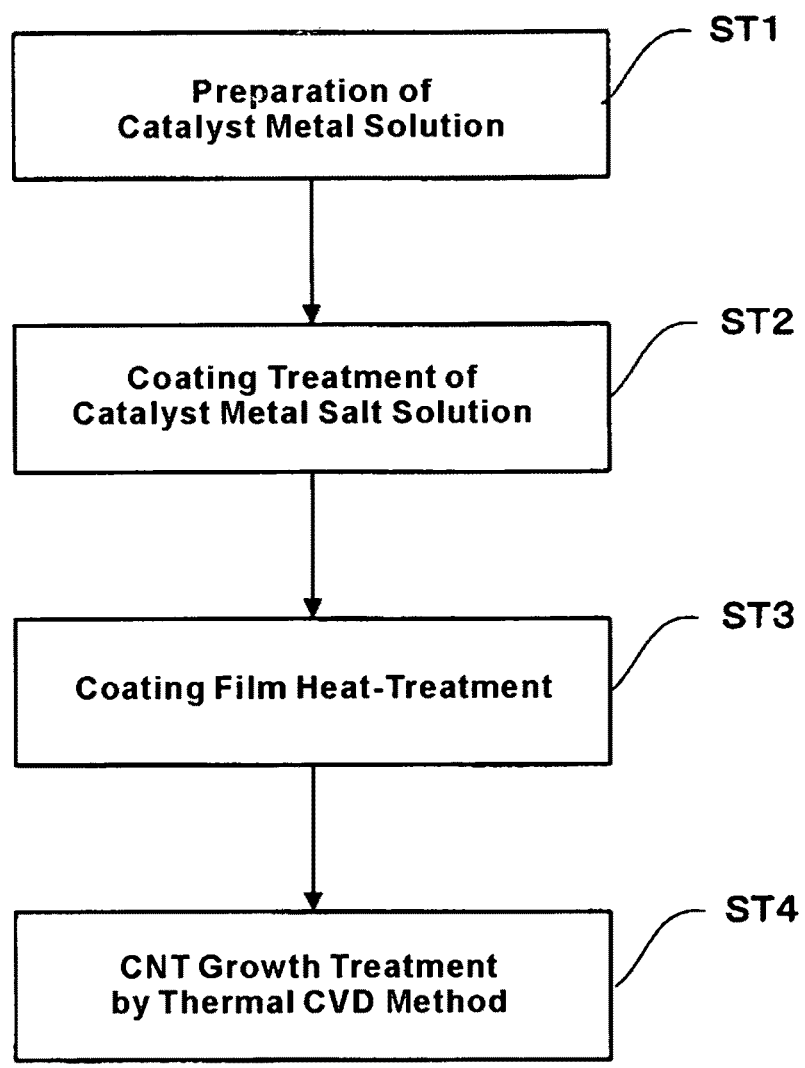
FIG. 1 is a figure showing the manufacture step order of highly oriented CNTs in the carbon nanostructure manufacturing process concerning the embodiment of the present invention.

FIG. 1 shows a figure showing the manufacturing steps of highly oriented CNTs in the present embodiment. The formation of the catalyst layer to be used for CNT production is performed by preparing a catalyst metal salt solution by dispersing or dissolving a metal compound (catalyst metal salt) that includes a catalyst metal into a solvent with ample wettability towards the substrate (catalyst metal salt solution preparation step ST1), then coating said catalyst metal salt solution as a thin film on said substrate (substrate coating step ST2 of the catalyst metal salt solution). After that, the catalyst layer is formed by heat-treating said film (heat-treatment step ST3), then CNTs are grown by a thermal CVD method by introducing the substrate on which this catalyst layer is formed into the carbon nanostructure synthetic device described later (CNT growth treatment step ST4). The coating film formation by the catalyst metal salt solution in substrate coating step ST2 is performed by a spin coat method, a spray method, or a dip coat method.

In the present embodiment, the coating film formation in substrate coating step ST2 was performed using a spin coat method. In a spin coat method, the procedure and the devices are simple, and it is suitable for a small-scale experiment. However, a spray method and a dip coat method are advantageous for carrying out the present invention in an industrial scale. A spray method, in particular, is advantageous for a practical use, because it can cope with an uneven surface, the control of film formation is simple, and moreover, an arbitrary pattern can be drawn in a short time by spray printing.

Figure 2:
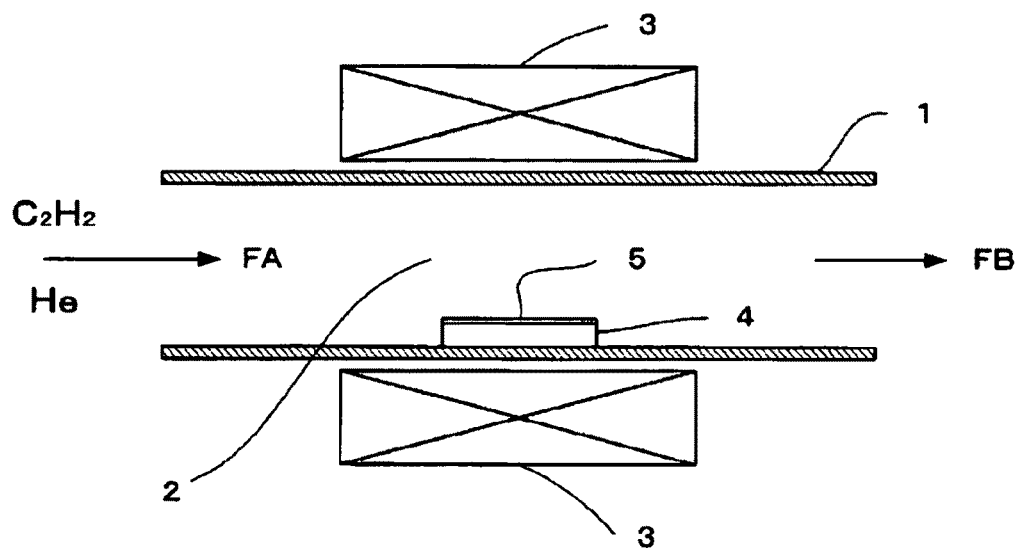
FIG. 2 is a schematic configuration figure of the carbon nanostructure synthetic device concerning the present embodiment.

FIG. 2 is a schematic configuration figure of the carbon nanostructure synthetic device used in CNT growth treatment step ST4. This synthetic device comprises reaction chamber 1 where carbon nanostructures (CNTs) are grown using a thermal CVD method. Reaction chamber 1 comprises a tubular space with both ends open, and is equipped with thermal CVD processing component 2 heated by reaction heater 3. Substrate 4, on which catalyst coating film layer 5 for CNT growth is formed on the substrate surface through said steps ST1-3, is placed in thermal CVD processing component 2. In this synthetic device, CNTs are grown and formed on the substrate by a thermal CVD method by means of the catalytic action of catalyst coating film layer 5, while a raw material gas such as hydrocarbon is introduced into reaction chamber 1 and is distributed to thermal CVD processing component 2.

As for substrate 4, a substrate of a ceramic material, an inorganic nonmetal, or an inorganic nonmetal compound, which possesses durability at the thermal CVD treatment temperature, is preferable. For example, a quartz plate, a silicon substrate, a silicon wafer, a quartz plate, a fused silica plate, a sapphire plate, or a stainless steel plate and such can be used. In the present embodiment, silicon wafers are used. For the substrate configuration, besides a flat plate-like form, various kinds of forms such as a multilayer substrate, a tubular body, and a polyhedron can be used.

As shown by arrow FA, the raw material gas and the carrier gas (helium He) are introduced from one end of reaction chamber 1, and as shown by arrow FB, are exhausted from the other open end. The carrier gas is a gas for circulating and transporting the raw material gas smoothly inside reaction chamber 1. While the raw material gas is consumed by the reaction, a gas that is completely inert and non-consumable is preferable as the carrier gas. Besides helium and argon, a mixed gas of helium and argon, or an inert gas such as neon, nitrogen, carbon dioxide, krypton, xenon, and others, or a mixed gas thereof is used as the carrier gas.

For the raw material gas, not only a hydrocarbon but also an organic gas such as a sulfur-containing organic gas, a phosphorus-containing organic gas, and such is used extensively. An organic gas that is suitable for the generation of carbon nanostructures with a given structure is chosen. A hydrocarbon is preferable among the organic gases, in that it does not generate an extraneous material.

For the hydrocarbon, an alkane compound such as methane and ethane, an alkene compound such as ethylene and butadiene, an alkyne compound such as acetylene, an aryl hydrocarbon compound such as benzene, toluene, and styrene, an aromatic hydrocarbon having condensed rings such as indene, naphthalene, and phenanthrene, a cycloparaffin compound such as cyclopropane and cyclohexane, a cycloolefin compound such as cyclopentene, an alicyclic hydrocarbon compound having condensed rings such as a steroid, or others can be used. Also, a mixed hydrocarbon gas in which two or more kinds of the hydrocarbons mentioned above can be used. In particular, low molecular weight species among hydrocarbons is desirable. For example, acetylene, allylene, ethylene, benzene, toluene and such are preferable. In the present embodiment, acetylene $C_2H_2$ is used as the raw material gas for the CNT manufacture.

The catalyst metal is a transition metal such as iron, cobalt, nickel, molybdenum, platinum, and others. Iron, cobalt, and nickel are particularly preferable. Also, one kind or a mixture of two or more kinds among these metals can be used.

For example, as the metal compound, an organometallic salt such as an acetate salt, an oxalate salt, a citrate salt and such can be used as the catalyst metal salt. Alternatively, an inorganic metal salt such as a nitrate salt, an oxo acid salt and such can be used. Moreover, as the metal compound, one kind or a mixture of two or more kinds among these metal salts may be used.

In catalyst metal salt solution preparation step ST1, the solvent used for dispersing or dissolving the catalyst metal salt and making the catalyst metal salt solution is a special solvent that possesses an ample wettability with the substrate, and furthermore, preferably has a mutual solubility with water and the boiling point higher than water. Especially, a uniform catalyst coating film layer can be formed on the substrate by using an inorganic salt or an organic salt that possesses a property of not generating precipitates in solution, for example, iron nitrate that is an inorganic salt, or tris(acetylacetonato)iron that is an organic salt. Thus, a more homogeneous growth of CNTs can be achieved under a good thermal CVD processing environment where the influence of water is removed.

For the above special solvent, alcohols, glycols, glycol ethers, esters, ketones or aprotic polar solvents can be used. For the alcohols, a solvent comprising one or more kinds among 1-butanol, 2-butanol, and diacetone alcohol can be used.

For the glycols, a solvent comprising one or more kinds among ethylene glycol, propylene glycol, and diethylene glycol can be used.

For the glycol ethers, a solvent comprising one or more kinds among ethylene glycol monomethyl ether, ethylene glycol monomethyl ether acetate, ethylene glycol monoethyl ether, ethylene glycol monoethyl ether acetate, propylene glycol monomethyl ether (PGE), and propylene glycol monoethyl ether can be used.

For the esters, ethyl lactate can be used. In addition, for the ketones, acetylacetone can be used. Moreover, for the aprotic polar solvents, a solvent comprising one or more kinds among dimethyl sulfoxide (DMSO), N-methyl-2-pyrrolidone, and N,N-dimethylformamide (DMF) can be used.

The solvent has an ample wettability with the substrate materials of the silicon wafers and others, has moreover a mutual solubility with water, and possesses a property that the boiling point is higher than water. Through its physical properties of good wettability, mutual solubility, and boiling point, an influence of water can be removed sufficiently, and homogeneous and highly oriented CNTs can be grown by the thermal CVD treatment.

Figure 3:
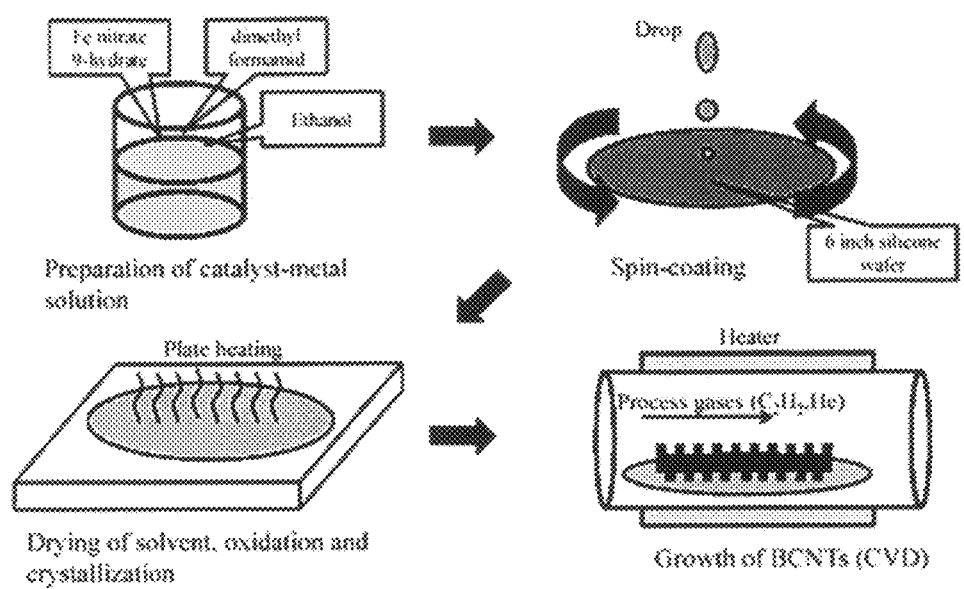
FIG. 3 is a figure of the manufacture steps of highly oriented CNTs for the case in which the application method by a spin coat method was employed for the present embodiment.

An example of the CNT manufacturing process in the present embodiment is explained in the following. In this particular example, iron is used as the catalyst metal, and iron nitrate salt is employed as the inorganic metal salt. 6-inch silicon wafers are used as the substrates. A spin coat method is used for the coating treatment in substrate coating process ST2 where the catalyst metal salt solution in catalyst metal salt solution preparation process ST1 that was prepared using the above solvent is coated as a film on the silicon wafer substrate. For the spin coat condition, the substrate was spinned at low speed, 700 rpm, for 15 seconds in the first step. In the next second step, it was spinned at high speed, 1800 rpm, for 20 seconds. The dropping speed was about 1 ml/second, and the time needed for the dropping was 2-3 seconds. FIG. 3 is a figure of the manufacture steps of highly oriented CNTs for the case in which the application method by a spin coat method is employed. The manufacture steps used in the present embodiment are shown.

To describe the spin coat treatment explicitly, at first, after the substrate is spinned for 5 seconds and stabilized during the first step, the liquid for catalyst layer formation is dropped for 2-3 seconds, the total dropping amount being 2-3 ml. As for the liquid dropping method, the dropping is done while the substrate is scanned from the central part to the peripheral part. After the dropping, the low-speed spinning is maintained for 7-8 seconds, and then the spin state is shifted from the low-speed spin to the high-speed spin of the second step within 3 seconds. After the high-speed spinning state is maintained for 17 seconds, the spinning is stopped. The extra solvent component is removed by evaporation through the spin coat treatment, and the coating film layer on the substrate becomes virtually dry.

By performing the liquid coating on the substrate by means of the spin coat method in two phases, the low-speed and the high-speed, a thin, uniform catalyst coating film layer can be formed through dropping of only a very small amount of the liquid. When the substrate size and the viscosity of solvents to be mixed into the liquid among others are considered, the preferred condition for the two-phase spin coating is the one in which the spin speed of the first step is 100-1000 rpm, and the spin speed of the second step is 500-3000 rpm.

In heat-treatment process ST3, the metal compound thin film formed by the above spin coating is thermally decomposed in an electric furnace, and is transformed into a catalyst metal oxide layer. As for the heating condition, for the case of an iron compound such as iron nitrate, it is introduced in an electric furnace at 700° C. for 10 minutes. This way, a CNT synthesis catalyst layer of a metal oxide remains on the substrate.

The substrate, on which the catalyst layer of the metallic oxide obtained by heat-treatment process ST3 is formed, is introduced into the synthetic device of FIG. 2, then CNT growth treatment step ST4 is carried out, and thus CNTs are grown on the substrate by the thermal CVD method. When $C_2H_2$ and He are used as the raw material gas and the carrier gas respectively, the thermal CVD treatment is done at the treatment temperature of 800° C. and the CVD processing time of 15 seconds. The gas supply conditions for $C_2H_2$ and He are 2.02 l/min and 2.38 l/min, respectively.

According to this embodiment, in substrate coating process ST2, because the catalyst coating film layer is formed by using the liquid in which the metal compound including the catalyst metal is dispersed or dissolved in the above solvent with an ample wettability with the substrate, the solvent component binds sufficiently to the substrate surface through the good wettability of the solvent, and the forming of the catalyst layer in a thin coating film form becomes possible. Moreover, by the coating effect of the binding ingredient, the influence of the water from the water-containing atmosphere (the ambient atmosphere) and the liquid on the CNT synthetic environment can be excluded from the substrate surface. In addition, the two-layer demixing process into water does not occur during the volatilization process. Especially, for example, even if a transition metal nitrate salt containing water of crystallization is used, the binding and remaining of water onto the substrate, or the occurrence of detrimental defects such as water repelling patterns, can be prevented. Because of this, a homogeneous, highly oriented carbon nanostructures can be grown by a thermal CVD treatment without being affected by the water from the moisture contained in the atmosphere and the transition metal salt.

In addition, as the methods for making a catalyst, there are a vacuum deposition method and a sputtering method, but it is difficult to form the catalyst onto to a large area, and they are disadvantageous from the view of the production cost. In the present embodiment, because it is possible to use the entire substrate surface as the effective formation area of the catalyst coating film layer, an improvement of yield can be planned, and it becomes possible to mass-produce homogeneous, highly oriented CNTs inexpensively. In particular, without performing a heat-treatment step for adhering and assembling fine particles of a catalyst metal oxide under inert gas or an atmosphere of a gas with reductive property, the processing can be shifted to CNT growth treatment step ST4 after a mere two-step treatment consisting of substrate coating step ST2 and heat-treatment step ST3, and by reducing the formation cost of the catalyst layer, highly oriented CNTs can be produced at low cost.

Next, the embodiment of a comparative experiment between the catalyst layer formation liquid concerning the present invention and the catalyst layer formation liquid concerning the method for forming catalyst layer in a prior-art (see Patent Document 3) is explained. For the prior art, a transition metal salt (iron nitrate) was dissolved in a liquid mixture of ethanol and α-terpineol, which in turn was coated onto a substrate (a silicon wafer), and thus a catalyst layer was formed.

As an example of the catalyst layer formation liquid concerning the present invention, iron (III) nitrate nonahydrate of (0.6 weight %) was added to a liquid mixture of ethanol and propylene glycol monoethyl ether (PGE) (mixing ratio 8:2), and thus the catalyst layer formation liquid was prepared. In addition, as another example, iron (III) nitrate nonahydrate (0.6 weight %) was added to a liquid mixture of ethanol and N,N-dimethylformamide (DMF) (mixing ratio 8:2), and thus the catalyst layer formation liquid was prepared. Catalyst layers were formed by coating these liquids on silicon wafers using a spin coat method in the same manner as substrate coating process ST2, and by heating in the same manner as heat-treatment process ST3.

Figure 4:
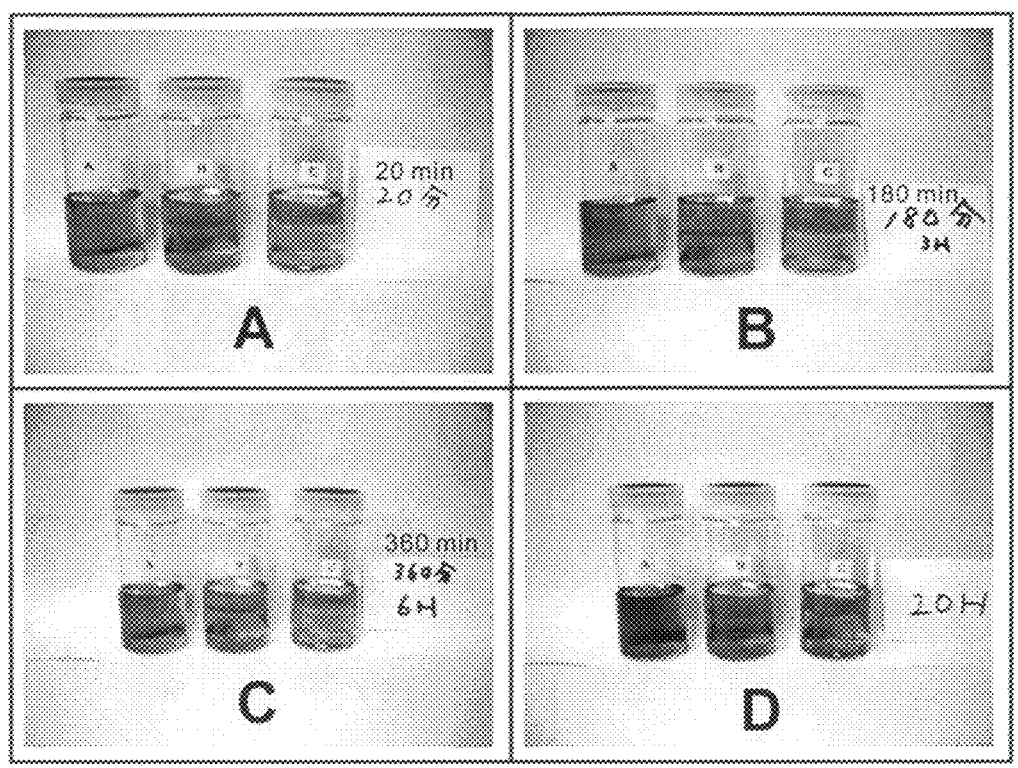
FIG. 4 is photographs showing the timewise transformations of the liquids, in an experimental embodiment where the liquid for catalyst layer formation concerning the present invention and the liquid for catalyst layer formation disclosed in a prior art were compared.

FIG. 4 is photographs showing the timewise color transformations of the above 3 types of liquids. The 3 containers shown in the photographs are, from left, the liquid mixture of terpineol of the prior-art, and the PGE and the DMF liquid mixtures concerning the present invention, respectively. Each of photographs A-D in FIG. 4 respectively shows the state of the liquids where 20 minutes, 180 minutes, 360 minutes, and 20 hours had passed after the liquid mixture preparation. As for the liquid mixture of terpineol in the prior-art, it changed to dark brown and precipitates formed after three hours had passed. On the other hand, in both the PGE and the DMF liquid mixtures concerning the present invention, there was no change in the liquid color, and precipitates did not form even after more than 20 hours had passed.

Figure 5:
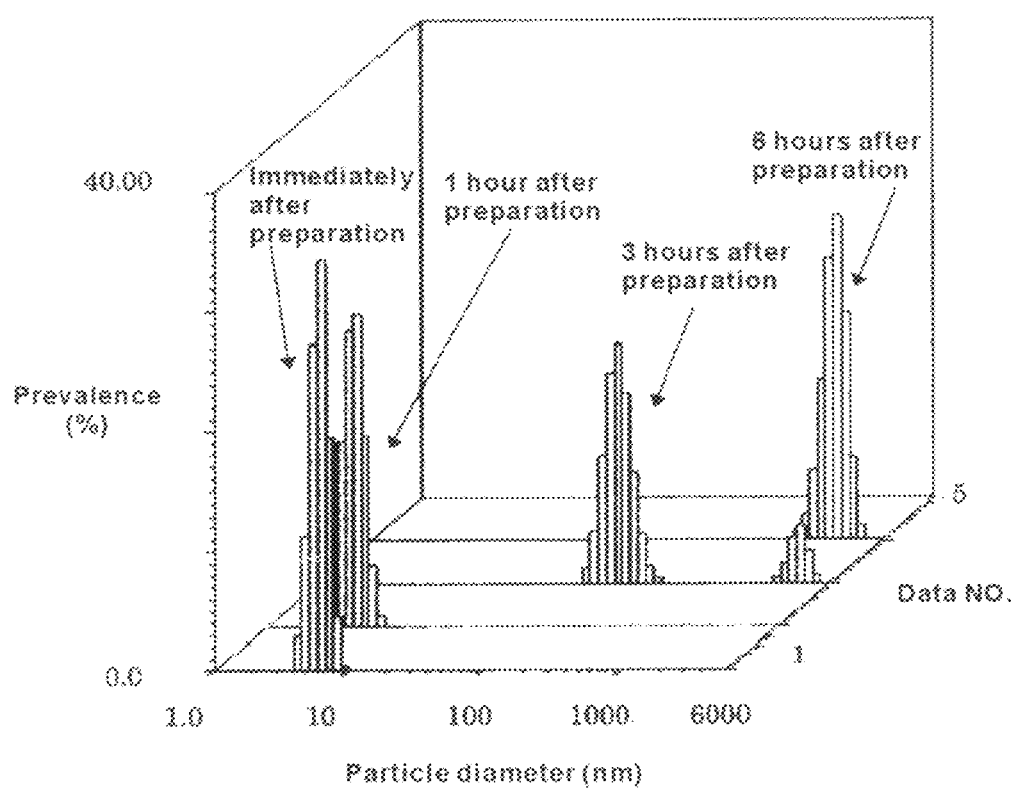
FIG. 5 is a figure showing the timewise transformation of the particle size distribution in the liquid for catalyst layer formation liquid in the prior-art.
Figure 6:
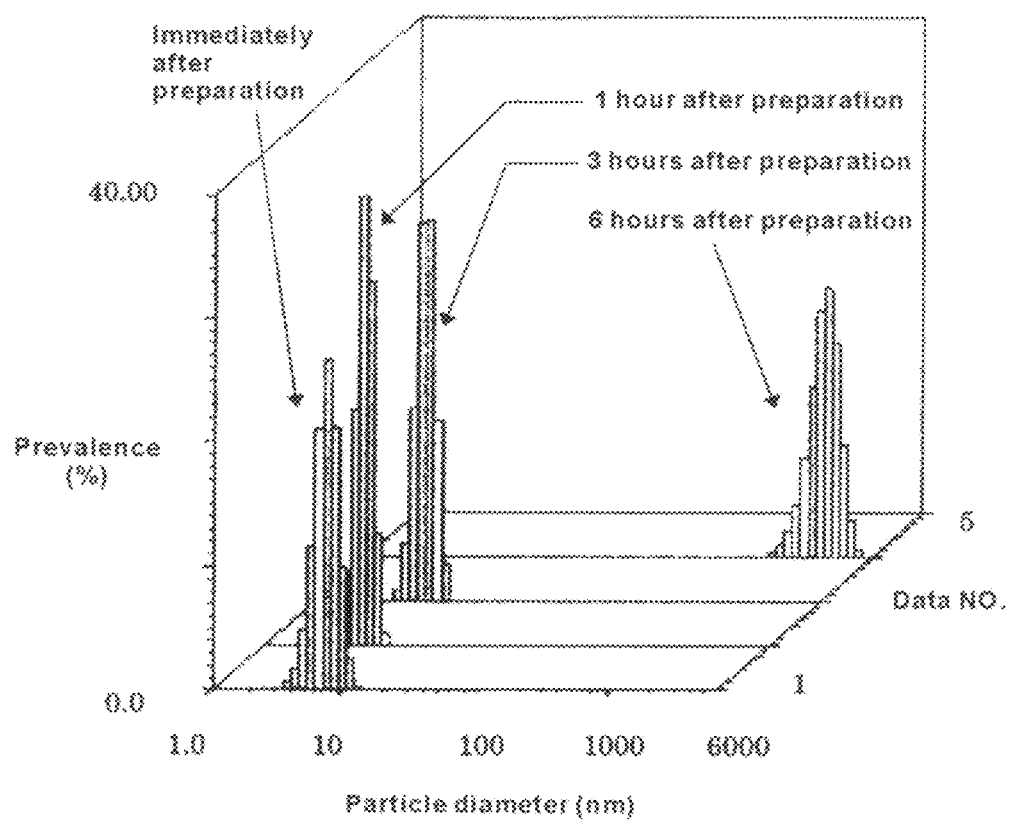
FIG. 6 is a figure showing the timewise transformation of the particle size distribution in the catalyst layer formation liquid concerning the present invention, whose solvent is PGE.
Figure 7:
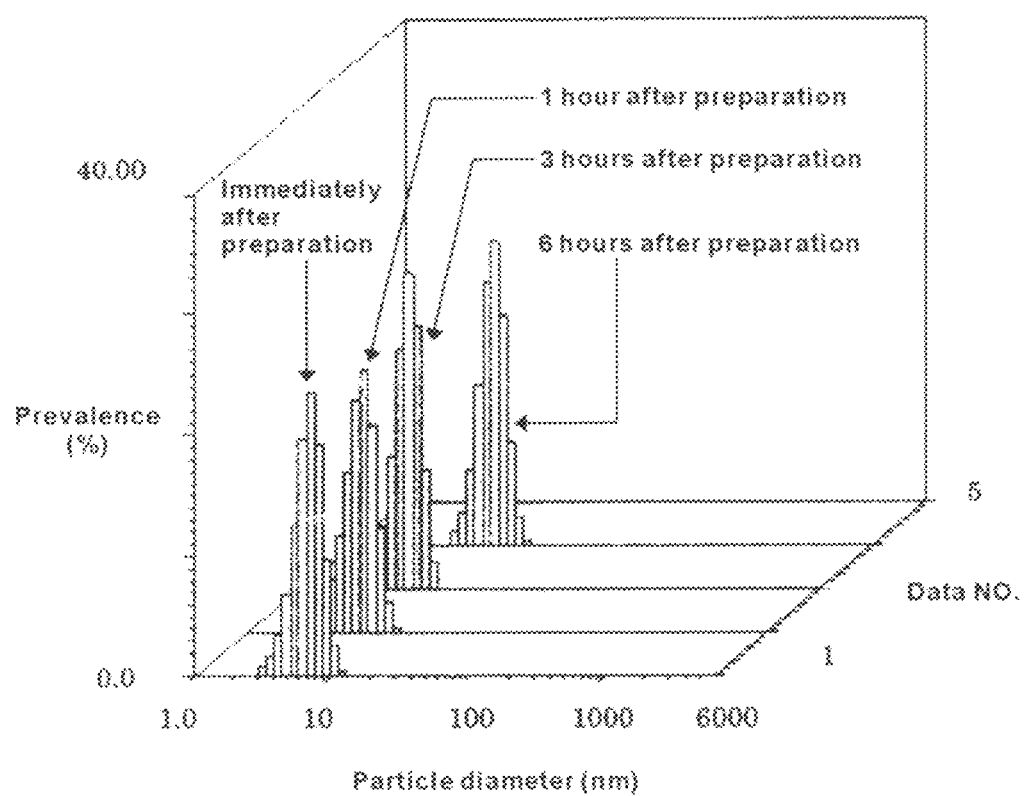
FIG. 7 is a figure showing the timewise transformation of particle size distribution of the catalyst layer formation liquid concerning the present invention, whose solvent is DMF.

FIGS. 5-7 each shows the timewise transformation of the particle size distributions in the above 3 types of liquid. In these figures, the measurement results of the particle size distributions just after the liquid preparation, and after the passing of 1 hour, 3 hours, and 6 hours are shown, in which the abscissa is the particle diameter (nm), and the ordinate is the prevalence of appearance (%). In the liquid mixture of terpineol from the prior art, the particle size distribution began to vary after 3 hours had passed, and as shown in FIG. 4, after 6 hours had passed, it was found through visual inspection that generation of precipitates was occurring. On the other hand, in case of the PGE liquid mixture concerning the present invention, even though the particle size distribution did change after 6 hours had passed, it was found that the liquid was stable and unchanging until the passing of 3 hours. In the case of the DMF liquid mixture, it was found that the liquid was stable and unchanged even after six hours had passed.

Figure 8:
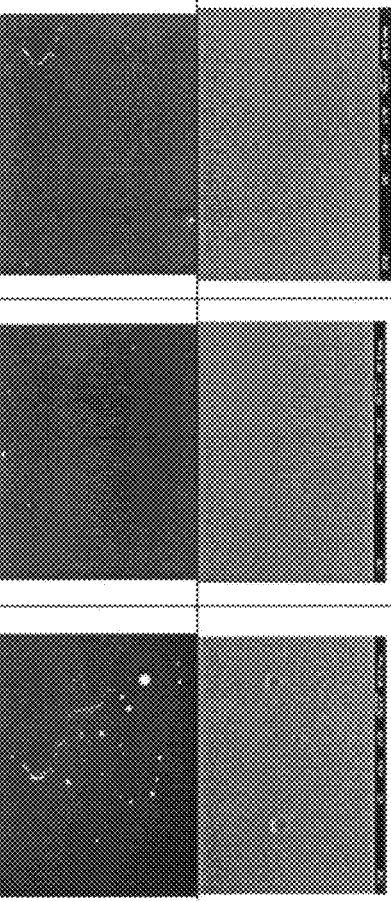
FIG. 8 is optical photographs showing the appearance of the surfaces of substrates on which the CNTs of the above comparative experiment are grown, SEM photographs imaging the CNT formation surfaces from above diagonally, and SEM photographs imaging the CNTs from sideways.

FIG. 8 is optical photographs of the outer appearance showing the substrate surfaces on which a catalyst layer is formed on each substrate by application of said 3 types of catalyst layer formation liquid through said spin coat and drying treatments, and CNTs are grown by means of each catalyst layer through a thermal CVD treatment; SEM photographs of the CNT generating surfaces imaged from above diagonally; and SEM photographs of the CNTs imaged from sideways.

The CNT non-growth defects were measured by analysis of the optical photographs showing the outer appearance. In the CNT synthesis using the liquid mixture of terpineol from the prior art, CNT non-growth defects whose flaw size was less than φ1 mm, φ1-5 mm, and greater than or equal to φ5 mm, respectively, appeared in a quantity of 250, greater than or equal to 50, and 1-5, respectively, per one 6-inch silicon wafer, and homogeneous CNTs could not be grown on the entire substrate surface.

On the other hand, in the PGE and DMF liquid mixtures concerning the present invention, CNT non-growth defects whose flaw size is smaller than φ1 mm and φ1-5 mm, respectively, are found in small numbers, specifically a quantity of 50 and less than or equal to 10, respectively, per one piece of 6 inches silicon wafer. Moreover, CNT non-growth defects larger than or equal to φ5 mm did not appear, and homogeneous CNTs could be obtained on the entire substrate surface.

The characteristics of the grown CNTs were measured by analysis of the SEM photographs. In the CNT synthesis using the liquid mixture of terpineol from the prior art, the average length of CNTs was 69 μm, the unit area weight was 0.14 mg/cm$^2$, and the bulk density was 20 mg/cm$^3$. In contrast, by the PGE liquid mixture concerning the present invention, the average length of CNTs was 113 μm, the unit area weight was 0.28 mg/cm$^2$, and the bulk density was 25 mg/cm$^3$, the result being certainly superior in length and density to the prior art. In addition, in the DMF liquid mixture concerning the present invention, the average length of CNTs was 149 µm, the unit area weight was 0.37 mg/cm$^2$ and the bulk density was 25 mg/cm$^3$. This too was certainly superior to the prior art. In addition, when the SEM photographs in FIG. 8 are compared to the SEM photograph in Patent Document 2, it is found that the CNTs in the present invention have high orientation.

In the prior art, because alcohols such as ethanol are hygroscopic, and because water of crystallization is contained in metal salts such as iron nitrate, water is mixed into the liquid for catalyst layer formation. When water is included in this liquid, a hydrolysis reaction occurs in the liquid, and precipitates of hydroxides such as iron hydroxide Fe(OH)$_3$ are produced. When such liquid is used, the predetermined film thickness cannot be obtained, and a growth of CNTs does not occur even if a thermal CVD treatment is done. Moreover, for example, upon using said solution of ethanol and iron nitrate, because its service life is limited to the short time that said hydrolysis reaction does not proceed, it is unsuitable for a mass production of CNT.

On the other hand, in the PGE and DMF liquid mixtures concerning the present invention, the special solvents PGE and DMF are provided with a good wettability of the substrate, and moreover, have a mutual solubility with water. Because of this, water such as the water of crystallization included in the metal compound can be taken into the liquid, and thus water remaining behind in the substrate surface can be reduced, even when a transition metal salt that contain water of crystallization is used. Therefore, binding and remaining of water on the substrate, and occurrence of detrimental defects such as repelling patterns, can be prevented. In addition, because the boiling point of the special solvent is higher than water, a two-phase demixing process into the solvent component of the liquid and water does not occur, and the evaporative removal of water can be done sufficiently. Moreover, through the solvation effect, generation of precipitates of hydroxides, such as iron hydroxide Fe(OH)$_3$, is restrained. Therefore, by using the special solvent concerning the present invention, CNTs that are homogeneous and highly oriented can be grown by means of a thermal CVD treatment without being affected by water.

As for the metal compound, it is preferable to use an inorganic or organic salt with a property that it does not generate precipitates in the liquid. In particular, an inorganic salt comprising iron nitrate or an organic salt comprising tris[acetylacetonato]iron has a good solubility by which it does not generate precipitates in liquid, and because of this, uneven formation of catalyst coating film layer through precipitated materials and uneven film thickness do not occur, and even more homogeneous and highly oriented CNTs can be grown by a thermal CVD treatment under a good thermal CVD manipulation environment from which the influence of water has been removed.

Table 1 shows Embodiments 1-16 in which iron nitrate nonahydrate was mixed with various special solvents concerning the present invention. That is to say, in Table 1, Examples 1-16 are shown in which CNT synthesis has been attempted using combination liquids of iron nitrate nonahydrate and one of alcohols, glycols, glycol ethers, esters, ketones or aprotic polar solvents (liquid concentration 0.6 weight %). These special solvents, as described above, are solvents that have a property of ample wettability with the substrate, and moreover, preferably have a mutual solubility with water, and a property of higher boiling point than water. At the same time, the prior arts in Patent Documents 3 and 4 are shown as Comparative Examples 1 and 2.

TABLE 1

Cases Where Ferric Sulfate Nonahydrate Was Used (Solution Concentration 0.6 Weight %)

| Embodiment | Type | Name | Wettability towards Silicon Wafers | Mutual Miscibility with Water | Boiling Point (° C.) | Condition of Solution | Formation of Highly Oriented CNTs |
|---|---|---|---|---|---|---|---|
| 1 | Alcohols | 1-Butanol | Good | Yes | 117.7 | Homogeneous | ○ |
| 2 | Alcohols | 2-Butanol | Good | Yes | 107.9 | Homogeneous | ○ |
| 3 | Alcohols | Diacetone Alcohol | Good | Yes | 169.2 | Homogeneous | ○ |
| 4 | Glycols | Ethylene Glycol | Good | Yes | 197.6 | Homogeneous | ○ |
| 5 | Glycols | Propylene Glycol | Good | Yes | 244 | Homogeneous | ○ |
| 6 | Glycols | Diethylene Glycol | Good | Yes | 188.2 | Homogeneous | ○ |
| 7 | Glycol Ethers | Ethylene Glycol Monomethyl Ether | Good | Yes | 124.5 | Homogeneous | ○ |
| 8 | Glycol Ethers | Ethylene Glycol Monomethyl Ether Acetate | Good | Yes | 144.5 | Homogeneous | ○ |
| 9 | Glycol Ethers | Ethylene Glycol Monoethyl Ether | Good | Yes | 135 | Homogeneous | ○ |
| 10 | Glycol Ethers | Ethylene Glycol Monoethyl Ether Acetate | Good | Yes | 156 | Homogeneous | ○ |
| 11 | Glycol Ethers | Propylene Glycol Monomethyl Ether | Good | Yes | 121 | Homogeneous | ○ |
| 12 | Glycol Ethers | Propylene Glycol Monoethyl Ether | Good | Yes | 132.8 | Homogeneous | ○ |
| 13 | Esters | Ethyl Lactate | Good | Yes | 154 | Homogeneous | ○ |
| 14 | Ketones | Acetylacetone | Good | Yes | 141 | Homogeneous | ○ |
| 15 | Aprotic Polar Solvents | N,N-Dimethylformamide | Good | Yes | 153 | Homogeneous | ○ |
| 16 | Aprotic Polar Solvents | N-Methyl-2-pyrrolidone | Good | Yes | 189 | Homogeneous | ○ |
| Comparative Example 1 | Patent Document 3 | Ethanol + α-Terpineol Liquid Mixture (weight ratio 8:2) | Good | * Low | * 217 | Homogeneous | Uneven |
| Comparative Example 2 | Patent Document 4 | Ethanol | Good | Yes | 78 | Homogeneous | Uneven |

* Value for α-terpineol

In Embodiments 1-3, alcohols (1-butanol, 2-butanol, or diacetone alcohol) were added. In all cases, homogeneous bined with alcohols, glycols, glycol ethers, esters, ketones, or aprotic polar solvents (liquid concentration 0.6 weight %).

TABLE 2

Cases Where Tris[acetylacetonato]iron Was Used (Solution Concentration 0.6 Weight %)

| Embodiment | Type | Name | Wettability towards Silicon Wafers | Mutual Miscibility with Water | Boiling Point (° C.) | Condition of Solution | Formation of Highly Oriented CNTs |
|---|---|---|---|---|---|---|---|
| 17 | Alcohols | 1-Butanol | Good | Yes | 117.7 | Homogeneous | ○ |
| 18 | Alcohols | 2-Butanol | Good | Yes | 107.9 | Homogeneous | ○ |
| 19 | Alcohols | Diacetone Alcohol | Good | Yes | 169.2 | Homogeneous | ○ |
| 20 | Glycols | Ethylene Glycol | Good | Yes | 197.6 | Homogeneous | ○ |
| 21 | Glycols | Propylene Glycol | Good | Yes | 244 | Homogeneous | ○ |
| 22 | Glycols | Diethylene Glycol | Good | Yes | 188.2 | Homogeneous | ○ |
| 23 | Glycol Ethers | Ethylene Glycol Monomethyl Ether | Good | Yes | 124.5 | Homogeneous | ○ |
| 24 | Glycol Ethers | Ethylene Glycol Monomethyl Ether Acetate | Good | Yes | 144.5 | Homogeneous | ○ |
| 25 | Glycol Ethers | Ethylene Glycol Monoethyl Ether | Good | Yes | 135 | Homogeneous | ○ |
| 26 | Glycol Ethers | Ethylene Glycol Monoethyl Ether Acetate | Good | Yes | 156 | Homogeneous | ○ |
| 27 | Glycol Ethers | Propylene Glycol Monomethyl Ether | Good | Yes | 121 | Homogeneous | ○ |
| 28 | Glycol Ethers | Propylene Glycol Monoethyl Ether | Good | Yes | 132.8 | Homogeneous | ○ |
| 29 | Esters | Ethyl Lactate | Good | Yes | 154 | Homogeneous | ○ |
| 30 | Ketones | Acetylacetone | Good | Yes | 141 | Homogeneous | ○ |
| 31 | Aprotic Polar Solvents | N,N-Dimetylformamide | Good | Yes | 153 | Homogeneous | ○ |
| 32 | Aprotic Polar Solvents | Dimethylsulfoxide | Good | Yes | 189 | Homogeneous | ○ |
| 33 | Aprotic Polar Solvents | N-Methyl-2-pyrrolidone | Good | Yes | 189 | Homogeneous | ○ |

CNTs were synthesized. In Embodiments 4-6, glycols (ethylene glycol, propylene glycol, or diethylene glycol) were added. In all cases, homogeneous, highly oriented CNTs were synthesized. In Embodiments 7-12, glycol ethers (ethylene glycol monomethyl ether, ethylene glycol monomethyl ether acetate, ethylene glycol monoethyl ether, ethylene glycol monoethyl ether acetate, PGE, or propylene glycol monoethyl ether) were added. In all cases, homogeneous, highly oriented CNTs were synthesized. In Embodiment 13, ethyl lactate, an ester, was added. Homogeneous, highly oriented CNTs were synthesized. In Embodiment 14, acetylacetone, a ketone, was added. Homogeneous, highly oriented CNTs were synthesized. In Embodiment 15, aprotic polar solvents that were ketones (N,N-dimethylformamide (DMF), N-methyl-2-pyrrolidone) were added. Homogeneous, highly oriented CNTs were synthesized.

On the other hand, Comparative Example 1, described in Patent Document 3, is a liquid mixture of ethanol: α-terpineol=8:2 (weight ratio). By the presence of α-terpineol, the mutual solubility with water is low. As a result, the synthesized CNTs grew in a non-homogeneous manner. Comparative Example 2 corresponds to Patent Document 4, in which iron nitrate nonahydrate was dissolved in ethanol in 0.6 weight % concentration. Because the boiling point of ethanol is 78° C., ethanol evaporates first, and water remains behind. As a result, the CNTs grew in a non-homogeneous manner, due to the water repelling pattern. Therefore, the great effect of the present invention can be understood.

Table 2 shows Embodiments 17-33, in which tris[acetylacetonato]iron was mixed into various special solvents concerning the present invention. That is to say, in Table 2, Embodiment 17-33 are shown, where CNT synthesis was attempted using liquids in which tris[acetylacetonato]iron was com- In Embodiments 17-19, alcohols (1-butanol, 2-butanol, or diacetone alcohol) were added. In all cases, homogeneous, highly oriented CNTs were synthesized. In Embodiments 20-22, glycols (ethylene glycol, propylene glycol, or diethylene glycol) were added. Approximately homogeneous, highly oriented CNTs were synthesized. In Embodiments 23-28, glycol ethers (ethylene glycol monomethyl ether, ethylene glycol monomethyl ether acetate, ethylene glycol monoethyl ether, ethylene glycol monoethyl ether acetate, PGE, or propylene glycol monoethyl ether) were added. In all cases, homogeneous, highly oriented CNTs were synthesized. In Embodiment 29, ethyl lactate, an ester, was added. Homogeneous, highly oriented CNTs were synthesized. In Embodiment 30, acetylacetone, a ketone, was added. Homogeneous, highly oriented CNTs were synthesized. In Embodiments 31-33, aprotic polar solvents that were ketones (DMF, N-methyl-2-pyrrolidone, or dimethyl sulfoxide (DMSO)) were added. In all cases, homogeneous, highly oriented CNTs were synthesized.

Next, an experiment was done to verify the optimum range of the liquid concentration of the inorganic or the organic salt in a catalyst layer formation liquid. In this experiment, the mixing ratio of each component was changed in liquid mixtures of iron nitrate nonahydrate, DMF, and ethanol, and then CNT synthesis was carried out according to the processing steps of FIG. 1. The concentration of iron nitrate nonahydrate was varied (14 variations) within the range of 0.1-3.0 weight %. The mixing ratio of DMF and ethanol was varied (12 variations) within the range of 0:100 to 100:0. The result is shown in Table 3.

TABLE 3

Investigation of the Solvent Mixing Ratio and the Concentration of Ferric Sulfate

| Concentration of Ferric Sulfate Nonahydrate (Weight %) | Mixing Ratio of N,N-Dimethylformamide:Ethanol (Weight %) | | | | | | | | | | | |
|---|---|---|---|---|---|---|---|---|---|---|---|---|
| | 0:100 | 5:95 | 10:90 | 20:80 | 30:70 | 40:60 | 50:50 | 60:40 | 70:30 | 80:20 | 90:10 | 100:0 |
| 0.1 | | | X | | X | | | | | | | X |
| 0.2 | | ○ | | | | | | | | | | |
| 0.3 | | | ○ | | | | | | | | | ○ |
| 0.4 | | | ○ | ○ | ○ | | | ○ | | | | |
| 0.5 | | ○ | ○ | ○ | ○ | | | | | | | ○ |
| 0.6 | X | | ○ | ○ | ○ | | | | | | | |
| 0.7 | | | | | ○ | | | ○ | | | | |
| 0.8 | | | ○ | ○ | | | ○ | | | | | ○ |
| 0.9 | | | | | | | | | | | | |
| 1.0 | | X | | | | | | | | | | |
| 1.1 | | | | | | | | | | | | |
| 1.2 | | | | | | | | | | | | |
| 1.3 | | | | | | | | | | | | |
| 1.4 | | | | | | | | | | | | |
| 1.5 | | X | | | | | | | | | | |

(○ indicates that highly oriented CNTs formed uniformly.)

Table 3 is a listing table compiling these results of the verification experiment. These experimental results indicated that the range of 0.2-0.8 weight % was suitable for the concentration of iron nitrate nonahydrate in the liquid, the range of 5.0-99.8 weight % was suitable for the combination concentration of special solvent DMF, and the synthesis of CNTs was not sufficient outside of this concentration range or combination concentration range. Therefore, by using the solvent at this concentration range or combination concentration range, more homogeneous and highly oriented carbon nanostructures can be grown by means of a thermal CVD treatment under a good thermal CVD treatment environment from which the influence of water has been removed.

The thickness and effect of catalyst layers can change by the coating condition and environment, and the types of solvent and solute. Therefore, an experiment to verify the optimum range of the concentration of inorganic or organic salts was done, using a solvent besides the said mixed solvent of DMF and ethanol. Liquid mixtures were made, using PGE as the solvent, and varying the concentration of iron nitrate nonahydrate. CNT synthesis was carried out according to the processing steps of FIGS. 1 and 3. The concentration of iron nitrate nonahydrate was varied (14 variations) within the range of 1.0-10.0 weight %.

Table 4 is a listing table summarizing the results of the verification experiments. These experimental results show that the range of 1.0-8.0 weight % for the liquid concentration of iron nitrate nonahydrate was suitable when PGE was used as the solvent, and in the concentration range outside of this, the homogeneity and orientation of the synthesized CNTs was not sufficient. Therefore, by using the solvent in such concentration range, more homogeneous and highly oriented carbon nanostructures can be grown by means of a thermal CVD treatment, under a good thermal CVD treatment environment from which the influence of water has been removed.

TABLE 4

Best Range for the Concentration of Ferric Sulfate Nonahydrate when PGE Is Used as the Solvent

| Concentration of Ferric Sulfate Nonahydrate (Weight %) | Result |
|---|---|
| 1.0 | ○ |
| 1.5 | ○ |
| 2.0 | ○ |
| 2.5 | ○ |
| 3.0 | ○ |
| 3.5 | ○ |
| 4.0 | ○ |
| 4.5 | ○ |
| 5.0 | ○ |
| 6.0 | ○ |
| 7.0 | ○ |
| 8.0 | ○ |
| 9.0 | X |
| 10.0 | X |

(○ indicates that highly oriented CNTs formed uniformly throughout the entire substrate surface.)

In the present invention, the liquid for catalyst layer formation, too, is an object. As a characteristic for liquids for catalyst layer formation, a long-term persistence of the solution stability (non-precipitability) upon dissolving a metal compound is required for a mass production of carbon nanostructures. Solutions of 0.6 weight % were prepared by adding iron nitrate nonahydrate in various solvents of the present invention, and the timewise transformation of the liquids was observed visually. In addition, solutions of 0.6 weight % were prepared by adding tris[acetylacetonato]iron in various solvents of the present invention, and the timewise transformation of the liquids was observed visually. At the same time, as Comparative Examples 3-5, 0.6 weight % solution in which iron nitrate nonahydrate was added to ethanol or α-terpineol, and 0.6 weight % solution in which tris[acetylacetonato]iron was added to ethanol were prepared. The results are shown in Table 5.

TABLE 5

Timewise Transformation after Solution Preparation
(Presence or Absence of Precipitates by Visual Inspection)

| Embodiment | Solvent | Timewise Transformation of Solution |
|---|---|---|
| (1) Ferric sulfate nonahydrate 0.6 weight % solution | | |
| Comparative Example 3 | Ethanol | Precipitates formed after 7 days |
| 34 | Ethylene Glycol | No precipitate observed even after 1 month had pased |
| 35 | Propylene Glycol | No precipitate observed even after 1 month had pased |
| 36 | Diethylene Glycol | No precipitate observed even after 1 month had pased |
| 37 | Ethylene Glycol Momomethyl Ether | No precipitate observed even after 1 month had pased |
| 38 | Acetylacetone | No precipitate observed even after 1 month had pased |
| 39 | N,N-Dimethylformamide | No precipitate observed even after 1 month had pased |
| 40 | N-Methyl-2-pyrrolidone | No precipitate observed even after 1 month had pased |
| Comparative Example 4 | α-Terpineol | Low solubility, solution cannot be prepared |
| (2) Acetylacetonatoiron 0.6 weight % solution | | |
| Comparative Example 5 | Ethanol | No precipitate observed even after 1 month had pased |
| 41 | Diacetonealcohol | No precipitate observed even after 1 month had pased |
| 42 | Ethylene Glycol | No precipitate observed even after 1 month had pased |
| 43 | Propylene Glycol | No precipitate observed even after 1 month had pased |
| 44 | Diethylene Glycol | No precipitate observed even after 1 month had pased |
| 45 | Ethylene Glycol Monomethyl Ether | No precipitate observed even after 1 month had pased |
| 46 | Propylene Glycol Monoethyl Ether | No precipitate observed even after 1 month had pased |
| 47 | Ethyl Lactate | No precipitate observed even after 1 month had pased |
| 48 | Acetylacetone | No precipitate observed even after 1 month had pased |
| 49 | N,N-Dimethylformamide | No precipitate observed even after 1 month had pased |
| 50 | Dimethylsulfoxide | No precipitate observed even after 1 month had pased |

As shown in Embodiments 34-40 and Embodiments 41-50, with the liquids making use of the solvents concerning the present invention, a precipitate generation was not observed visually even after one month had passed. Therefore, the liquid using the solvent of the present invention has extremely high solution stability and does not generate precipitates. Because of this, the time margin is sufficient during the coating step to the substrate of catalyst coating film layer, the heat-treatment step, and the production of carbon nanostructures. It was found that a liquid suitable for mass production could be offered. On the other hand, with the ethanol solvent corresponding to Patent Document 4, the solution stability was equal to or greater than one month in the [acetylacetonato]iron solution, but precipitates formed after 7 days in the iron nitrate nonahydrate solution. With α-terpineol, it was not even possible to prepare a solution because the solubility was too low. Therefore, the superiority of the liquid concerning the present invention may be understood.

In addition, in the present embodiment, a thermal decomposition method was used to decompose the raw material gas during the chemical vapor deposition, but, for example, a laser beam decomposition method, an electron beam decomposition method, an ion beam decomposition method, a plasma decomposition method, or other decomposition methods can be used.

Concerning the catalyst layer formed using the DMF liquid mixture of the present invention, to clarify the relationship between the concentration of said DMF liquid mixture and the thickness of said catalyst layer, the quantity of iron in the catalyst layer was measured, and the thickness of said catalyst layer was calculated from said quantity of iron and the area of said catalyst layer. A catalyst layer was formed on a 6-inch silicon substrate by a wet method (catalyst solution: iron nitrate nonahydrate+DMF), in which the catalyst solution was coated by a spin coat method, and after that, dried in the air for about 1 hour at the temperature of 25° C. To completely dissolve said catalyst layer, it was soaked in 25 ml of an aqueous hydrochloric acid solution (hydrochloric acid concentration: 50% by volume ratio) at the temperature of about 25° C. for more than 72 hours. The hydrochloric acid aqueous solution from the soaking was subjected to an ICP emission analysis (Shimazu Corporation ICPS-1000) without changing its concentration, and the concentration of iron dissolved in the aqueous hydrochloric acid solution was measured. Said concentration was substituted in Equation (2), and the thickness of the original catalyst layer was calculated. Because iron exists as iron oxide ($Fe_2O_3$) on substrates, the density of iron oxide is denoted in Equation 2.

Thickness of catalyst layer=159.69(formula weight of Fe2O3)×25(weight of iron in solution,g)×(concentration of iron determined by ICP emission analysis)/{2×55.847(atomic weight of iron)×175.52(area of wafer,cm$^2$)×5.2(density of Fe$_2$O$_3$, g/cm$^3$)×0.1(coefficient to converting the unit of film thickness into nm)}  (Equation 2)

Table 6 summarizes the concentration of iron nitrate nonahydrate in said DMF liquid mixture, the concentration of iron in the aqueous hydrochloric acid solution, and the original thickness of the catalyst layer. In the case where the concentration of iron nitrate nonahydrate in said DMF liquid mixture is 0.2 weight %, the thickness of said catalyst layer corresponds to 0.5 nm. In the case where said concentration is 0.5 weight %, said thickness corresponds to 2.1 nm. In the case where said concentration is 8.0 weight %, said thickness corresponds to 10 nm. Therefore, it is found that while said concentration and said thickness do not have a perfectly linear relationship, they are dependent on each other.

In the experiment where PGE was used as the solvent (Table 4), the concentration of iron nitrate nonahydrate in the range of 1.0-8.0 weight % is suitable. This corresponds to the catalyst layer thickness of 0.5-10 nm. In the experiment where a liquid mixture of DMF and ethanol is used as the solvent (Table 3), the concentration of iron nitrate nonahydrate in the range of 0.2-0.8% by weight is suitable. This corresponds to the catalyst layer thickness of 0.5-4 nm. Therefore, the present invention can be used when the catalyst layer thickness is 0.5-10 nm. Furthermore, it is found that cases where the catalyst layer thickness is 0.5-4 nm are preferable, because the flexibility of allowable solvent is great. If the catalyst layer thickness is made thin, the grain diameter of the catalyst particle can be prevented from overgrowing, and the high orientation of the growing carbon nanostructures becomes assured. Because of this, the most preferred case is where the catalyst layer thickness is 0.5-1.5 nm.

TABLE 6

Measurement by ICP-MS of Thickness of Catalyst Layer Formed from DMF Mixture

| Concentration of Ferric Sulfate Nonahydrate (weight %) | Concentration of Iron in Aqueous Hydrochloric Acid Solution (ppm) | Thickness of Catalyst Layer (nm) |
| --- | --- | --- |
| 0.2 | 1.3 | 0.5 |
| 0.5 | 5.4 | 2.1 |
| 8.0 | 25.5 | 10 |

The catalyst layer in the present invention is formed by a wet method. On the other hand, in the prior technology, catalyst layers formed through dry methods (for example, electron beam (EB) deposition) exist. (See Patent Document 1.) To confirm how the CNTs produced in the present invention and the CNTs produced by a dry method differ structurally, transmission electron microscope (TEM) photographs of both said CNTs were taken, and the structures were elucidated by analyzing said photographs.

The wet-method catalyst was formed by means of a DMF liquid mixture. In addition, the dry-method catalyst was formed by means of EB deposition (film thickness 4 nm). By means of both catalysts, CNTs were grown using the synthetic device of FIG. 2. Photographs were obtained by submitting the oriented CNTs thus produced to TEM. Based on these photographs, the CNT inside and outside diameters and the numbers of layers were measured, and histograms were made.

Figure 9:
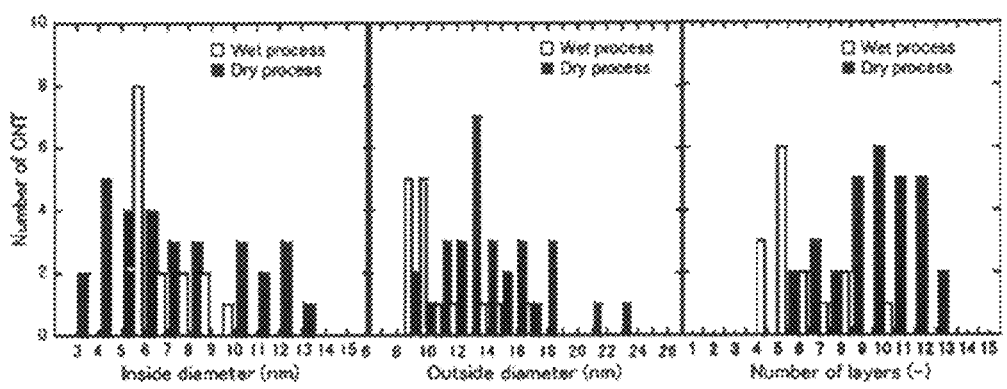
FIG. 9 is histograms of the inside diameters, the outside diameters, and the layer numbers of the oriented CNTs that were produced by the wet method of the present embodiment and the dry method of the prior art.

FIG. 9 is the histograms of the inside and outside diameters, and the layer numbers of the oriented CNTs produced by the wet and the dry methods. When the dry method catalyst was used, an extreme unevenness was found in the distribution. Also, it was found that large, thick CNTs were produced in comparison with the wet method catalyst, in terms of the outside diameter (around 14 nm at the center) and the number of layers (around 10 layers at the center). In addition, in the wet method catalyst, a peak is found for the inside diameter (6 nm), the outside diameter (10 nm), and the number of layers (5 layers), and it was found that homogeneous, highly oriented CNTs that are thinner with fewer number of layers were produced, compared to the dry method catalyst.

The present invention is not limited to the embodiments described above. Various modifications, design alterations, and others that do not involve a departure from the technical concept of the present invention are also included in the technical scope of the present invention.

INDUSTRIAL APPLICABILITY

Through this invention, homogeneous, highly orientated carbon nanostructures such as CNTs can be grown, and because their mass production can be realized at low cost, CNTs and their likes can be applied to electron emission sources, electronic parts such as electrodes, and fuel cells, so that their high functional performance and low cost can be achieved.

The invention claimed is:

1. A method for producing a carbon nanostructure, comprising the following steps in the following order:
   forming a catalyst layer for growing a carbon nanostructure on a substrate in a water-containing atmosphere whose water concentration is greater than or equal to 1000 ppm,
      wherein forming said catalyst layer comprises a coating step and a heat-treatment step,
      wherein said coating step comprises preparing a liquid by dispersing or dissolving iron nitrate comprising water of crystallization in a solvent, followed by coating said liquid on said substrate,
      wherein said liquid comprises a distribution of different size particles,
      wherein a coating film layer comprising said iron nitrate is formed,
      wherein said heat-treatment step comprises forming said catalyst layer by heating said coating film layer,
      wherein said solvent comprises propylene glycol monoethyl ether and N,N-dimethylformamide,
      wherein the concentration of said iron nitrate in said liquid is 0.2-8.0 weight %,
      wherein the concentration of said solvent is 5.0-99.8 weight %,
      wherein the color of said liquid remains unchanged until at least twenty hours after the preparation of said liquid,
      wherein said distribution of different size particles remains unchanged until at least three hours after the preparation of said liquid, and
      wherein no precipitation is visible in said liquid until at least one month after the preparation of said liquid;
   distributing a raw material gas to said catalyst layer; and
   growing said carbon nanostructure through a thermal CVD treatment, thereby producing the carbon nanostructure on said substrate by the catalytic action of said catalyst layer.

2. The method for producing a carbon nanostructure according to claim 1, wherein a thickness of said catalyst layer is 0.5 nm-10 nm.

* * * * *